United States Patent
Wu

(10) Patent No.: US 11,470,644 B2
(45) Date of Patent: Oct. 11, 2022

(54) CONTROL INFORMATION TRANSMISSION METHOD, TERMINAL DEVICE AND NETWORK DEVICE

(71) Applicant: GUANGDONG OPPO MOBILE TELECOMMUNICATIONS CORP., LTD., Guangdong (CN)

(72) Inventor: Zuomin Wu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/409,561

(22) Filed: Aug. 23, 2021

(65) Prior Publication Data

US 2021/0385864 A1 Dec. 9, 2021

Related U.S. Application Data

(63) Continuation of application No. PCT/CN2019/095326, filed on Jul. 9, 2019.

(51) Int. Cl.
*H04L 12/28* (2006.01)
*H04W 74/08* (2009.01)
(Continued)

(52) U.S. Cl.
CPC ... *H04W 74/0816* (2013.01); *H04W 72/0446* (2013.01); *H04W 72/0453* (2013.01); *H04W 74/006* (2013.01); *H04W 74/0841* (2013.01)

(58) Field of Classification Search
CPC .............. H04W 48/12; H04W 72/042; H04W 72/0446; H04W 72/0453; H04W 76/11; H04W 16/14; H04L 5/0098
(Continued)

(56) References Cited

U.S. PATENT DOCUMENTS

2019/0174449 A1 6/2019 Shan et al.
2019/0246378 A1* 8/2019 Islam .................... H04W 72/12
(Continued)

FOREIGN PATENT DOCUMENTS

CN 109391424 A 2/2019
CN 109428700 A 3/2019
(Continued)

OTHER PUBLICATIONS

3GPP TSG RAN WG1#96bis-R1-1905710—Xian, China, Apr. 8-12, 2019—Motorola Mobility, Lenovo, Feature lead summary for NR-U DL Signals and Channels (24 pages).
(Continued)

*Primary Examiner* — John Pezzlo
(74) *Attorney, Agent, or Firm* — Perkins Coie LLP

(57) ABSTRACT

The implementations of the present disclosure relate to a control information transmission method, a terminal device and a network device. The method comprises: a terminal device receiving downlink control information (DCI) sent by a network device, wherein the DCI comprises at least one information block, and a first information block of the at least one information block comprises control information of a first cell; and the first information block comprises at least one of the following: an identifier of the first cell, slot format indication (SFI) information, frequency domain resource indication information, frequency domain resource, end position information of the COT, physical random access channel (PRACH) resource indication information, and position indication information of a synchronization signal block (SSB).

16 Claims, 4 Drawing Sheets

(51) Int. Cl.
*H04W 72/04* (2009.01)
*H04W 74/00* (2009.01)
*H04J 1/16* (2006.01)

(58) Field of Classification Search
USPC ........................................ 370/252, 329, 430
See application file for complete search history.

(56) References Cited

U.S. PATENT DOCUMENTS

| | | | | |
|---|---|---|---|---|
| 2019/0349966 | A1* | 11/2019 | Salem | H04W 16/14 |
| 2020/0092861 | A1* | 3/2020 | Xu | H04L 5/0032 |
| 2020/0351682 | A1* | 11/2020 | Cirik | H04L 5/0091 |
| 2020/0383144 | A1* | 12/2020 | Sun | H04L 5/1469 |
| 2021/0127396 | A1* | 4/2021 | Su | H04W 72/1289 |
| 2021/0282182 | A1* | 9/2021 | Nogami | H04W 74/08 |
| 2022/0061094 | A1* | 2/2022 | Jung | H04W 74/006 |
| 2022/0104258 | A1* | 3/2022 | Moon | H04L 27/2613 |

FOREIGN PATENT DOCUMENTS

| | | |
|---|---|---|
| CN | 109560904 A | 4/2019 |
| CN | 109845171 A | 6/2019 |
| EP | 3836721 A1 | 6/2021 |
| EP | 3962224 A1 | 3/2022 |

OTHER PUBLICATIONS

3GPP TSG RAN WG1#97-R1-1907705—Reno, USA, May 13-17, 2019—Motorola Mobility, Lenovo, Feature lead summary for NR-U DL Signals and Channels (24 pages).
International Search Report dated Mar. 20, 2020 of PCT/CN2019/095326 (6 pages).
Extended European Search Report for the European application No. 19937191.5, dated Apr. 26, 2022. 14 pages.
First Examination Report of the Indian application No. 202117038279, dated Mar. 9, 2022. 8 pages with English Translation.
Huawei et al. "DL channels and signals in NR unlicensed band" R1-1906042; 3GPP TSG RAN WGI Meeting #97 Reno, USA, May 13-17, 2019. 12 pages.
Intel Corporation "DL Signals and Channels for NR-unlicensed" R1-1904283; 3GPP TSG RAN WG1 Meeting #96bis Xi'an, China, Apr. 8-12, 2019. 5 pages.

* cited by examiner

CONTROL INFORMATION TRANSMISSION METHOD, TERMINAL DEVICE AND NETWORK DEVICE

CROSS-REFERENCE TO RELATED APPLICATION

This application is a continuation application of International application No. PCT/CN2019/095326 filed on Jul. 9, 2019, of which the entire disclosure is hereby incorporated by reference.

TECHNICAL FIELD

The present disclosure relates to the field of communications, in particularly to a method for transmitting control information, a terminal device and a network device.

BACKGROUND

Data transmission on an unlicensed spectrum is supported in a New Radio (NR) system. When performing communication on the unlicensed spectrum, a communication device needs to follow a principle of Listen Before Talk (LBT), that is, before sending a signal on a channel of the unlicensed spectrum, the communication device needs to perform channel sensing (or referred to as channel detecting) first, and the communication device may send the signal only when a result of channel sensing is that the channel is idle. If the result of channel sensing performed by the communication device on the unlicensed spectrum is that the channel is busy, the signal cannot be send.

For an NR-based access to unlicensed spectrum (NR-U) system deployed on an unlicensed spectrum, there is no clear regulation on how to design a control information indication in the NR-U system.

SUMMARY

Implementations of the present disclosure provide a method for transmitting control information, a terminal device and a network device.

In a first aspect, a method for transmitting control information is provided, which includes: receiving, by a terminal device, downlink control information (DCI) sent by a network device, wherein the DCI includes at least one information block, a first information block of the at least one information block includes control information of a first cell, and the first information block includes at least one type of the following information: an identifier of the first cell, slot format indication (SFI) information, frequency domain resource indication information, channel occupation time (COT) length information, end position information of the COT, physical random access channel (PRACH) resource indication information, or position indication information of a synchronization signal block (SSB).

In a second aspect, a method for transmitting control information is provided, which includes: sending, by a network device, downlink control information (DCI) to a network device, wherein the DCI includes at least one information block, a first information block of the at least one information block includes control information of a first cell, and the first information block includes at least one type of the following information: an identifier of the first cell, slot format indication (SFI) information, frequency domain resource indication information, channel occupation time (COT) length information, end position information of the COT, physical random access channel (PRACH) resource indication information, or position indication information of a synchronization signal block (SSB).

In a third aspect, a terminal device is provided, which is configured to perform the method in the first aspect or various implementations thereof.

Specifically, the terminal device includes function modules for performing the method in the above first aspect or various implementations thereof.

In a fourth aspect, a network device is provided, which is configured to perform the method in the second aspect or various implementations thereof.

Specifically, the network device includes functional modules for performing the method in the above second aspect or various implementations thereof.

In a fifth aspect, a terminal device is provided, which includes a processor and a memory. The memory is configured to store a computer program, and the processor is configured to call and run the computer program stored in the memory to perform the method in the first aspect or in various implementation modes thereof.

In a sixth aspect, a network device is provided, which includes a processor and a memory. The memory is configured to store a computer program, and the processor is configured to call and run the computer program stored in the memory to perform the method in the second aspect or various implementation modes thereof.

In a seventh aspect, an apparatus is provided, which is configured to perform the method according to any one of the first and second aspects described above and various implementations thereof.

Specifically, the apparatus includes a processor configured to call and run a computer program from a memory to enable a device in which the apparatus installed to perform the method in any one of the above first and second aspects or various implementation modes thereof.

Optionally, the apparatus is a chip.

In an eighth aspect, a computer readable storage medium is provided, which is configured to store a computer program, when the computer program is run on a computer, the computer is enabled to perform the method according to any one of the first and second aspects described above and various implementations thereof.

In a ninth aspect, a computer program product is provided, which includes computer program instructions, when the computer instructions are executed by a computer, the computer is enabled to perform the method according to any one of the first and second aspects described above and various implementations thereof.

In a tenth aspect, a computer program is provided, when the computer program is run on a computer, the computer is enabled to perform the method according to any one of the first and second aspects described above and various implementations thereof.

DETAILED DESCRIPTION

Technical solutions in implementations of the present disclosure will be described below with reference to the drawings in the implementations of the present disclosure. It is apparent that the implementations described are just some implementations of the present disclosure, but not all implementations of the present disclosure. According to the implementations of the present disclosure, all other implementations achieved by a person of ordinary skills in the art without paying an inventive effort are within the protection scope of the present disclosure.

The technical solutions of the implementations of the present disclosure may be applied to various communication systems, such as a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, LTE Time Division Duplex (TDD), an Advanced long term evolution (LTE-A) system, a New Radio (NR) system, an evolution system of NR system, an LTE-based access to unlicensed spectrum (LTE-U) system, an NR-based access to unlicensed spectrum (NR-U) system, a Universal Mobile Telecommunication System (UMTS), a Worldwide Interoperability for Microwave Access (WiMAX) communication system, Wireless Local Area Networks (WLAN), Wireless Fidelity (WiFi), a next generation communication system or other communication systems.

Figure 1:
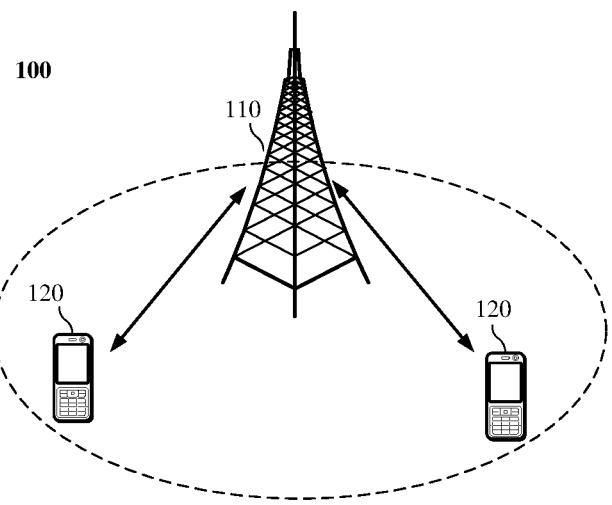
FIG. 1 is a schematic diagram of architecture of a communication system according to an implementation of the present disclosure.

Illustratively, a communication system 100 in which an implementation of the present disclosure is applied is shown as FIG. 1. The communication system 100 may include a network device 110, and the network device 110 may be a device that communicates with a terminal device 120 (or referred to as a communication terminal, or a terminal). The network device 110 may provide communication coverage for a specific geographical area, and may communicate with terminal devices located within the coverage area. Optionally, the network device 110 may be a Base Transceiver Station (BTS) in a GSM system or CDMA system, a NodeB (NB) in a WCDMA system, an Evolutional Node B (eNB or eNodeB) in a LTE system, or a radio controller in a Cloud Radio Access Network (CRAN), or the network device may be a network side device in a mobile switch center, a relay station, an access point, a vehicle-mounted device, a wearable device, a hub, a switch, a bridge, a router, or a 5G network, or a network device in a future evolved Public Land Mobile Network (PLMN), etc.

The communication system 100 also includes at least one terminal device 120 located within the coverage area of the network device 110. As used herein, the term "terminal device" includes, but not limited to, a device configured to receive/send a communication signal via a wired circuit, for example, via a Public Switched Telephone Network (PSTN), a Digital Subscriber Line (DSL), a digital cable, a direct cable; and/or another data connection/network; and/or via a wireless interface, for instance, for a cellular network, a Wireless Local Area Network (WLAN), a digital television network such as a Digital Video Broadcasting-Handheld (DVB-H) network, a satellite network, or an AM-FM broadcast transmitter; and/or another terminal device; and/or an Internet of Things (IoT) device. A terminal device configured to communicate via a wireless interface may be referred to as a "wireless communication terminal", a "wireless terminal" or a "mobile terminal". Examples of the mobile terminal include, but not limited to, a satellite or cellular telephone, a Personal Communication System (PCS) terminal capable of combining a cellular wireless telephone and data processing, faxing and data communication abilities, a Personal Digital Assistant (PDA) that may include a radio telephone, a pager, an internet/intranet access, a Web browser, a memo pad, a calendar, and/or a Global Positioning System (GPS) receiver, and a conventional laptop and/or palmtop receiver or other electronic apparatus including a radio telephone transceiver. The terminal device may be referred to as an access terminal, a User Equipment (UE), a subscriber unit, a subscriber station, a mobile station, a mobile platform, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device or a computing device with a wireless communication function, or other processing device connected to a wireless modem, a vehicle-mounted device, a wearable device, a terminal device in a 5G network, or a terminal device in a future evolved Public Land Mobile Network (PLMN), or the like.

Optionally, device to device (D2D) communication may be performed between the terminal devices 120.

Optionally, the 5G system or 5G network may be referred to as a New Radio (NR) system or a NR network.

FIG. 1 shows one network device and two terminal devices as an example. Optionally, the communication system 100 may include multiple network devices, and other quantities of terminal devices may be included within the coverage area of each network device, which is not limited in implementations of the present disclosure.

Optionally, the communication system 100 may include other network entities such as a network controller, and a mobile management entity, which are not limited in implementations of the present disclosure.

It should be understood that, a device with a communication function in a network/system in the implementations of the present disclosure may be referred to as a communication device. Taking the communication system 100 shown in FIG. 1 as an example, the communication devices may include a network device 110 and a terminal device 120 which have communication function, and the network device 110 and the terminal device 120 may be the specific devices described above, which will not be described here again. The communication device may also include other devices in the communication system 100, such as a network controller, a mobile management entity, and other network entities, which are not limited in the implementations of the present disclosure.

It should be understood that the terms "system" and "network" are often used interchangeably here.

A flexible slot format is proposed in an NR system, in which the slot format can be expressed as information of downlink symbols, flexible symbols and uplink symbols included in a slot. Such slot formats may be called different slot formats (SFs).

Currently, an NR protocol can support up to 256 slot formats, of which 25 slot formats are shown in Table 1. In Table 1, a line represents a slot format, "D" represents a downlink symbol, "U" represents an uplink symbol, and "F" represents a flexible symbol. It can be seen that slot format 0 denotes that all 14 symbols in a slot are downlink symbols, slot format 1 denotes that all 14 symbols in a slot are uplink symbols, and slot format 20 denotes that first 2 symbols in a slot are configured as downlink symbols, last one is configured as an uplink symbol, and middle 11 symbols are configured as flexible symbols.

TABLE 1

| Slot Format | Number of Symbols for a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | D | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | U | U |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | U | U | U | U |

In the NR system, slot format indication (SFI) information can be transmitted through Group-common Physical Downlink Control Channel (GC-PDCCH), and a corresponding Downlink Control Information (DCI) format is DCI format 2-0. A cyclic redundancy check (CRC) corresponding to DCI format 2-0 may be scrambled by SFI-Radio Network Temporary Identity (RNTI), which may be configured by a high layer.

A size of DCI format 2-0 may be configured by a high layer, and a maximum number of bits of DCI format 2-0 is 128 bits. A DCI format 2-0 may include SFI information of one cell or a group of cells. Specifically, DCI information transmitted by DCI format 2-0 may be as follows:

SFI 1, SFI 2, . . . , SFI N

Therein, SFI 1 represents SFI information of cell 1, SFI 2 represents SFI information of cell 2, . . . , SFI N represents SFI information of cell N. A size of an SFI-index domain (for example, SFI 1) may be 9 bits, which is used for indicating a slot format combination identifier.

For each cell, the terminal device may be configured with the following information: an identifier of a cell, a position of SFI-index domain in DCI format 2-0, a slot format combination set, and a reference subcarrier interval. Each slot format combination in the slot format combination set may include a slot format combination identifier and at least one slot format indicator, and the slot format combination identifier corresponds to the at least one slot format indicator. For the reference subcarrier interval, if it is an unpaired spectrum operation mode, the reference subcarrier interval may be a reference subcarrier interval corresponding to a normal uplink carrier or a supplementary uplink carrier; if it is a paired spectrum operation mode, the reference subcarrier interval may be a reference subcarrier interval corresponding to a downlink (DL) bandwidth part (BWP) or an uplink (UL) BWP.

In a process of the terminal device determining a slot format of cell 1, specifically, after detecting DCI format 2-0 according to the SFI-RNTI, the terminal device may find the identifier of cell 1 according to a parameter configured by a high layer, and determine a starting position of SFI-index domain of cell 1 in the detected DCI format 2-0. Then, the terminal device may read an SFI-index domain from the starting position, and determine the slot format of cell 1 from the slot format combination set configured by the high layer according to the slot format combination identifier indicated by the SFI-index domain.

Generally, a time length of the slot format determined by the terminal device in the above manner is greater than or equal to a detection period of a PDCCH carrying DCI format 2-0. That is to say, the terminal device may receive two piece of SFI indication information at two different times, and time lengths indicated by the two pieces of SFI indication information may partially overlap, herein slot format indicated by the two piece of SFI indication information are the same on the overlapping time length.

In order to deepen understanding of the implementations of the present disclosure, an unlicensed spectrum is briefly introduced below.

An unlicensed spectrum is a spectrum that may be used for radio device communication divided by countries and regions. The spectrum may be considered as a shared spectrum, that is, communication devices in different communication systems may use the spectrum and may not apply for exclusive spectrum authorization from a government, as long as they meet a regulatory requirement on the spectrum set by the countries or regions. In order to enable various communication systems using the unlicensed spectrum for wireless communication to coexist friendly on the spectrum, a principle of Listen Before Talk (LBT) needs to be based, that is, before a communication device sends a signal on a channel of the unlicensed spectrum, channel listening (or channel sensing) needs to be performed first, and only when a result of channel listening is that the channel is idle, can the communication device send the signal. If the result of channel listening performed by the communication device on the unlicensed spectrum is that the channel is busy, the signal cannot be sent. And in order to ensure fairness, in one transmission, duration of signal transmission performed by the communication device using the channel on the unlicensed spectrum may not exceed a Maximum Channel Occupation Time (MCOT).

Figure 2:
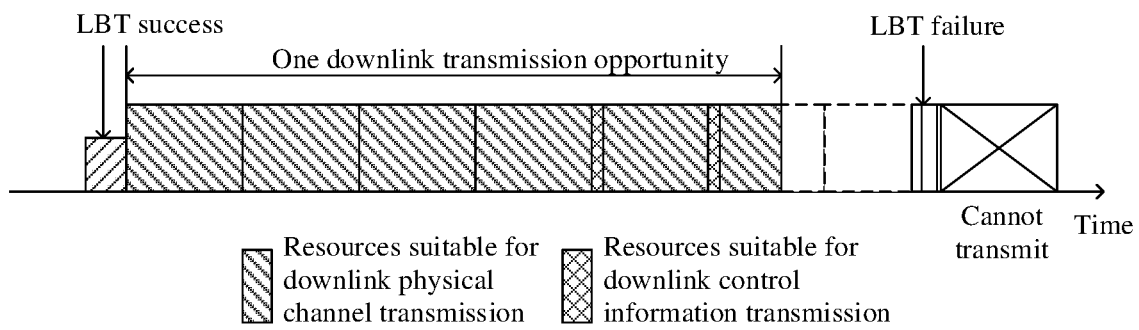
FIG. 2 is a schematic diagram of downlink transmission in a LAA-LTE system.

In a process of downlink signal transmission in a licensed-assisted access (LAA)-LTE system, as shown in FIG. 2, if an LBT of a network device fails, a signal transmission cannot be performed. If the LBT of the network device is successful, the network device can perform a downlink transmission with a transmission opportunity not exceeding the MCOT. Herein, one downlink transmission opportunity may be defined as a time unit of continuous transmission of the network device.

Because a transmission of the network device is opportunistic, the transmission can only be performed if LBT succeeds, and cannot be performed if LBT fails. Therefore, in order to achieve correct data communication with the network device, the terminal device in the cell served by the network device needs to determine when the network device starts and stops a downlink transmission. To solve this problem, in the LAA-LTE system, there may be a cell-specific reference signal (CRS) on each subframe sent by the network device, so that the terminal device can determine whether there is a downlink transmission of the network device on a current subframe by detecting whether a CRS exists. With reference to FIG. 2, the network device may indicate an end position of the downlink transmission by transmitting downlink control information (DCI) on a last subframe and a last second subframe of the downlink transmission, and the DCI includes indication information of a symbol corresponding to the end position of the downlink transmission.

However, at present, for the NR-U system, how to design a control information indication, based on DCI format 2-0 in the NR system, in the NR-U system is not clearly defined. In order to solve the above problems, implementations of the present disclosure proposes a method for transmitting control information, which can effectively achieve the control information indication in the NR-U system.

Figure 3:
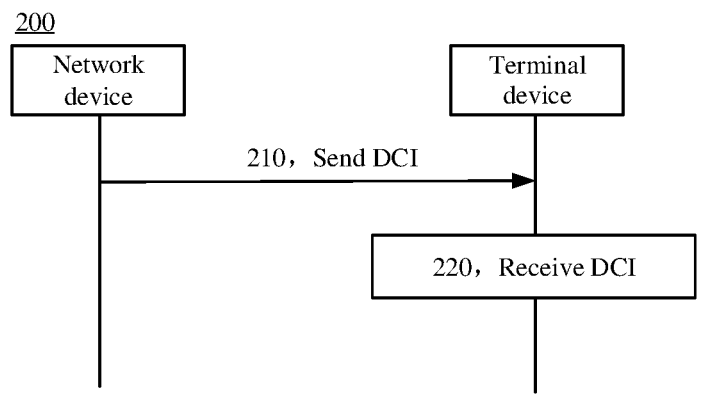
FIG. 3 is a schematic flow chart of a method for transmitting control information according to an implementation of the present disclosure.

FIG. 3 is a schematic flowchart of a method 200 for transmitting downlink control information according to an implementation of the present disclosure. The method of FIG. 3 may be performed by a terminal device and a network device, the terminal device may be, for example, the terminal device 120 shown in FIG. 1, and the network device may be, for example, the network device 110 shown in FIG. 1. As shown in FIG. 3, the method 200 may include at least part of following acts 210 and 220.

In 210, a network device sends DCI to a terminal device, the DCI includes at least one information block, a first information block of the at least one information block includes control information of a first cell, and the first information block may include but is not limited to at least one type of the following information: an identifier of the first cell, SFI information, frequency domain resource indication information, channel occupancy time (COT) length information, end position information of the COT, physical random access channel (PRACH) resource indication information, or position indication information of an synchronization signal block (SSB).

In 220, the terminal device receives DCI sent by the network device.

Herein, the control information of the first cell may include but is not limited to at least one type of the following information: the SFI information, the frequency domain resource indication information, the COT length information, the end position information of the COT, the PRACH resource indication information, or the position indication information of the SSB. It can be seen that the first information block may include the control information of the first cell and the identifier of the first cell, or, the first information block may only include the control information of the first cell.

The control information may be common control information, for example, the control information may be sent through GC-PDCCH. Or, the control information may be control information specific to the terminal device, and in this case, the DCI may be carried in a dedicated PDCCH of the terminal device. The control information may be downlink control information, uplink control information, or sidelink control information, which is not specifically limited in the implementations of the present disclosure.

Optionally, the above process may include that the terminal device receives the control information sent by the network device, and determines indication information of a time domain resource occupation and/or indication information of a frequency domain resource occupation on the first cell according to the control information. Or, the above process may include that the network device receives the control information sent by the terminal device, and determines the indication information of the time domain resource occupation and/or the indication information of the frequency domain resource occupation on the first cell according to the control information. Or, the above procedure may include control information in a sidelink transmission from one terminal device to another terminal device. In this case, a first terminal device may receive the control information sent by a second terminal device, and determines the indication information of the time domain resource occupation and/or the indication information of the frequency domain resource occupation on the first cell according to the control information.

The term "and/or" in the document is merely an association relationship describing associated objects, indicating that there may be three relationships, for example, A and/or B may indicate three situations: A alone, A and B, and B alone.

In an implementation of the present disclosure, the network device may send DCI to the terminal device through an unlicensed carrier, or may send DCI to the terminal device through an authorized carrier. Accordingly, the terminal device may receive the DCI sent by the network device through the unlicensed carrier, or may receive the DCI through the authorized carrier.

As for the information included in the first information block, as an example, the information in the first information block may be preset. For example, a protocol may preset that each information block includes a cell identifier, SFI information and COT length information. For another example, the protocol may preset that when a channel access equipment type of the network device is load based equipment (LBE), each information block includes a cell identifier, SFI information, frequency domain resource indication information and COT length information. When the channel access equipment type of the network device is frame based equipment (FBE), each information block includes SFI information and frequency domain resource indication information.

The LBT mode on an unlicensed spectrum may include the channel access equipment type of LBE and the channel access equipment type of FBE. Herein, LBE means that the communication device may perform channel detection on the unlicensed spectrum after a service arrives, and start a signal transmission after the channel detection is successful. FBE means that the communication device may periodically perform channel detection, and a channel resource that may be used for service transmission also appears periodically.

Optionally, the information in the first information block may be preset according to a spectrum to which the cell corresponding to the first information block belongs. For example, the protocol may preset that when the cell corresponding to the information block is a cell on an authorized spectrum, each information block includes SFI information, and when the cell corresponding to the information block is a cell on an unlicensed spectrum, each information block includes SFI information, frequency domain resource indication information and COT length information.

As another example, the information included in the first information block may be determined according to a high layer configuration parameter. For example, the high layer may configure information in different information blocks corresponding to different cells to be the same, e.g. each information block includes a cell identifier, SFI information and COT length information. Or, the high layer may configure the information in the information blocks corresponding to different cells to be different. For example, for a first cell, information in the first information block configured by the high layer configuration parameter may be SFI information, frequency domain resource indication information, and COT length information. For a second cell, information in the second information block configured by the high layer configuration parameter may be SFI information, frequency domain resource indication information, COT length information, PRACH resource indication information and position indication information of an SSB. Optionally, the high layer may configure the information included in the information block corresponding to the cell according to a spectrum to which the cell belongs.

As another example, the information included in the first information block may be determined by the network device and the terminal device through negotiation.

It should be understood that the above modes of determining the information in the first information block may also be used in combination. As another example, if the cell is a cell on a licensed spectrum, the protocol presets the information included in the information block corresponding to the cell, for example, presets that SFI information is included; if the cell is a cell on an unlicensed spectrum, the high layer configuration parameter configures the information included in the information block corresponding to the cell, for example, the high layer configuration parameter configures that SFI information, frequency domain resource indication information, and COT length information are included in the information block.

Optionally, in an implementation of the present disclosure, the high layer configuration parameter includes radio resource control (RRC) information or media access control (MAC) control element (CE) information.

It should be understood that specific examples in the implementations of the present disclosure are only intended to help those skilled in the art to better understand the implementations of the present invention, which are not intended to limit the scope of the implementations of the present disclosure.

In an implementation of the present disclosure, one information block may correspond to one cell, that is, each information block in at least one information block included in the DCI may include control information of one cell. For example, the DCI includes three information blocks, namely, a first information block, a second information block and a third information block. The first information block may include control information of a first cell, the second information block may include control information of a second cell, and the third information block may include control information of a third cell.

As an example, a size of information bits included in each information block may be preset. For example, the protocol may preset that the size of each information block is fixed at 20 bits.

As another example, a size of information bits included in each information block may be configured by a high layer. For example, the high layer configuration parameter may configure a size of the first information block, e.g. 20 bits, 30 bits, and so on. It should be understood that sizes of information bits configured by the high layer configuration parameter for different cells may be the same or different, that is, sizes of bits included in each information block may be the same or different, which is not specifically limited by the implementations of the present disclosure.

As another example, a size of information bits included in each information block may be determined according to a high layer configuration parameter. For example, the DCI includes control information of two cells which are a first cell and a second cell. Assuming that SFI information has a bit size of 9 bits, frequency domain resource indication information has a bit size of 4 bits, COT length information has a bit size of 4 bits, PRACH resource indication information has a bit size of 5 bits, and position indication information of an SSB has a bit size of 3 bits. For the first cell, the information configured by the high layer configuration parameter is the SFI information, the frequency domain resource indication information and the COT length information, so the first information block corresponding to the first cell includes 17 bits. For the second cell, the information configured by the high layer configuration parameter is the SFI information, the frequency domain resource indication information, the COT length information, the PRACH resource indication information and the position indication information of the SSB, so the second information block corresponding to the second cell includes 25 bits. It can be seen that the size of information bits included in the information block corresponding to each cell can be independently determined.

Optionally, in an implementation of the present disclosure, if channel access equipment types in the unlicensed frequency domain are different, corresponding information blocks may be different. In this case, the first information block may correspond to a first channel access equipment type. Herein, the first information block corresponding to the first channel access equipment type can be understood as follows: if the network device performs LBT according to the first channel access equipment type, the first information block is the information block corresponding to the first cell under the first channel access equipment type; in other words, information included in the first information block is determined according to the first channel access equipment type. The first channel access equipment type can be LBE or FBE.

Optionally, information blocks under different channel access equipment types include different information. For example, if the first channel access equipment type is LBE, the first information block may include SFI information, frequency domain resource indication information and COT length information. If the first channel access equipment type is FBE, the first information block may include SFI information, frequency domain resource indication information, COT length information, and position indication information of an SSB.

Optionally, in an implementation of the present disclosure, a corresponding relationship between the information block and the channel access equipment type may be determined according to a high layer configuration parameter, or may be determined by a protocol.

Hereinafter, the technical solutions of the implementations of the present disclosure will be described in detail by taking the information included in the first information block as an example, but which is not limited by the present disclosure.

(a) Cell Identifier

In the implementations of the present disclosure, the cell identifier may be a cell ID. Therein, the cell ID may be but is not limited to a serving cell ID or a cell global identifier (CGI). It should be understood that the CGI mentioned here may be an evolved universal terrestrial radio access network (E-UTRAN) CGI (ECGI), or may be an NR CGI (NCGI).

Figure 4:
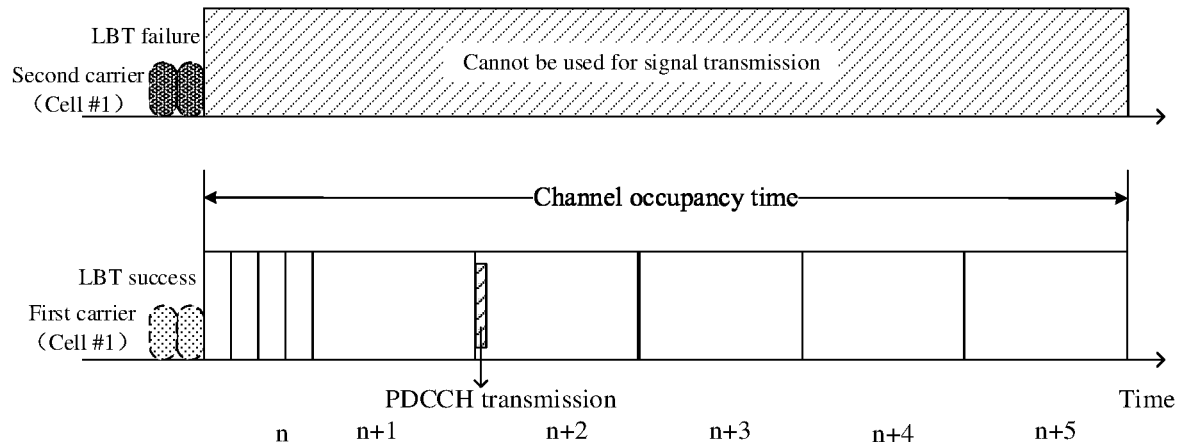
FIG. 4 is a schematic diagram of transmitting a signal on an unlicensed spectrum according to an implementation of the present disclosure.

It should be noted that on an unlicensed carrier, whether each cell may obtain successful channel detection is independently determined. For the terminal device, a carrier may be regarded as a cell. As shown in FIG. 4, the network device successfully detects a channel on a first carrier (e.g., cell #0), but fails to detect a channel on a second carrier (e.g., cell #1), or the cell #1 has not obtained a right to use the unlicensed spectrum. However, if a position of a starting bit of control information of each cell in the DCI is configured by a high layer, the control information of the cell configured by the high layer will always be sent in the DCI. How to make the terminal device dynamically determine which control information of cells is control information after obtaining the right to use the unlicensed spectrum (or effective control information), and which control information of cells is control information without obtaining the right to use the unlicensed spectrum (or invalid control information) are problems to be solved.

In a possible implementation, the DCI sent by the network device may not include an information block corresponding to cell #1. In order for the terminal device to determine a cell corresponding to the control information in the DCI, information for determining a cell identity may be included in the information block. After receiving the DCI, the terminal device may determine the control information of the cell according to the cell identifier included in the information block. If the DCI does not include the cell ID of cell #1, the terminal device may determine that the DCI does not include the control information of cell #1, or the terminal device may assume that cell #1 has not obtained the right to use the unlicensed spectrum.

Figure 5:
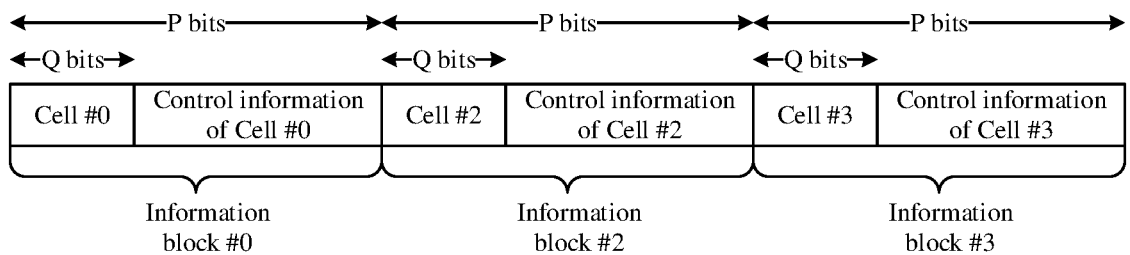
FIG. 5 is a schematic diagram of an information block according to an implementation of the present disclosure.

Specifically, a size of information bits included in each of at least one information block included in the DCI is fixed as P bits, and Q bits included in the P bits may be used for determining a cell identifier. P and Q are positive integers. After receiving the DCI, the terminal device determines the control information corresponding to the cell according to the cell identifier determined in each information block in the DCI. As an example, it is assumed that according to a high layer configuration information, the DCI may include control information of cell #0, cell #1, cell #2 and cell #3, when the network device sends the DCI, cell #0, cell #2 and cell #3 get the right to use the channel, but cell #1 does not get the right to use the channel. Then, the control information of cell #1 may not be included in the DCI, for example, it may be as shown in FIG. 5.

In another possible implementation, the DCI may only include control information of one cell (e.g., the first cell), in other words, the information included in the DCI belongs to indication information of the first cell, then there may be no information block in the DCI, that is, there may be no concept of information block in this case. Optionally, the DCI may not include the cell identifier for determining the first cell, and the high layer may not configure the starting position of the control information of the first cell in the DCI for the first cell. In this case, if the channel detection on the first cell is successful, the network device may send the DCI and the terminal device may receive the DCI. If the channel detection on the first cell fails, the network device may not send the DCI.

(b) First Indication Information

In an implementation of the present disclosure, the first information block may further include first indication information, and the first indication information is used for determining whether the control information of the first cell included in the first information block is valid. It should be understood that in the implementation of the present disclosure, the validity of the control information of the first cell may include but not limited to the control information when the first cell obtains the right to use the unlicensed spectrum, and the invalidity of the control information of the first cell may include but not limited to the control information when the first cell does not obtain the right to use the unlicensed spectrum.

Optionally, the invalidity of the control information of the first cell included in the first information block may be that at least part of the control information of the first cell included in the first information block is invalid. For example, the control information of the first cell included in the first information block includes SFI information, frequency domain resource indication information and PRACH resource indication information. The first indication information may be used for determining that all the control information of the first cell included in the first information block is invalid (i.e., the SFI information, the frequency domain resource indication information and the PRACH resource indication information are invalid indications). Or, the first indication information may be used for determining that the control information of the first cell included in the first information block is partially invalid. For example, the first indication information is used for determining that the SFI information and the frequency domain resource indication information in the first information block are invalid, but the PRACH resource indication information can still be a valid indication.

As an example, the first indication information may be an independent information field. For example, the first indication information may include 1 bit, where bit "1" indicates that the control information of the first cell is valid, and bit "0" indicates that the control information of the first cell is invalid. Or, bit "1" indicates that the control information of the first cell is invalid, and bit "0" indicates that the control information of the first cell is valid. Further illustratively, the first indication information may include multiple bits. If the multiple bits are the same, it means that the control information of the first cell is valid; if at least two bits of the multiple bits are different, it means that the control information of the first cell is invalid. For example, "000" indicates that the control information of the first cell is valid, and "010" indicates that the control information of the first cell is invalid. Further illustratively, the first indication information may include multiple bits. If the multiple bits are the same and all are "1", it means that the control information of the first cell is valid; if the multiple bits are the same and all are "0", it means that the control information of the first cell is invalid.

As another example, the first indication information may be a first information state of the at least one type of information included in the first information block. Optionally, the first information state indicates that the control information of the first cell is invalid.

For example, the first information block includes SFI information which occupies 9 bits, and the first indication information is an information state in the SFI information. Illustratively, if all 9 bits of the SFI information are "1" or "0", it means that the control information of the first cell is invalid. Otherwise, the SFI information is used for indicating a slot format combination. For another example, the first information block includes SFI information and COT length information, in which the SFI information occupies 9 bits and the COT length information occupies 4 bits. The first indication information is an information state jointly determined by the SFI information and the COT length information. For example, if 9 bits of the SFI information and 4 bits of the COT length information are all "1" or "0", it means that the control information of the first cell is invalid. Otherwise, the SFI information is used for indicating a slot format combination, and the COT length information is used for indicating the COT length.

As another example, the first indication information may be a second information state of part or all of bits in the first information block. Optionally, the second information state indicates that the control information of the first cell is invalid.

illustratively, the first information block includes SFI information, frequency domain resource indication information, and COT length information, in which a bit size of the SFI information is of 9 bits, a bit size of the frequency domain resource indication information is of 4 bits, and a bit size of the COT length information is of 4 bits, then the first information block includes 17 bits. If all of 17 bits of the first information block are "1" or "0", it means that the control information of the first cell is invalid. Otherwise, the control information of the first cell is interpreted normally. Or, if first M bits or last N bits of the 17 bits of the first information block are all "1" or are all "0", it means that the control information of the first cell is invalid, otherwise, the control information of the first cell is interpreted normally, N and M are positive integers. Or, if a number of bits "1" in the 17 bits of the first information block is greater than a number of bits "0", it means that the control information of the first cell is invalid, otherwise, the control information of the first cell is interpreted normally Or, if a number of bits "1" in the 17 bits of the first information block is less than a number of bits "0", it means that the control information of the first cell is invalid, otherwise, the control information of the first cell is interpreted normally.

The above indication mode enables the terminal device to determine effective cell control information from the control information of one or more cells included in the DCI after receiving the DCI.

In a possible implementation, a high layer configuration parameter configures a starting position of the control information of the first cell in the DCI, such that the terminal device may read the control information field of the first cell from the starting position in the DCI after detecting the DCI, thereby determining the control information of the first cell.

In another possible implementation, a size of information bits included in each of at least one information block included in the DCI is fixed as P bits, and the terminal device may determine a cell corresponding to each information block according to a parameter configured by a high layer. For example, configuration information of the high layer parameter may determine that the DCI includes S information blocks which correspond to a cell group including S cells, herein an i-th information block in the S information blocks corresponds to an i-th cell in the S cells. Assuming that the first cell is a j-th cell in the S cells, the terminal device finds a j-th information block included in the DCI after detecting the DCI, and reads bits in the j-th information block, thereby determining the control information of the first cell.

Optionally, the first information block may include the first indication information but not include the cell identifier.

Figure 6:
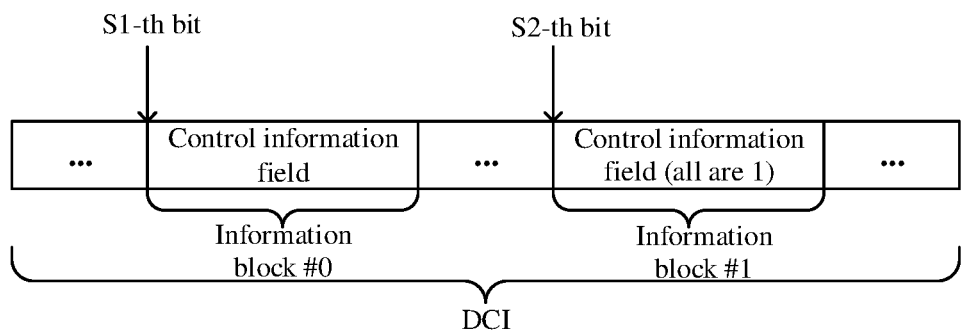
FIG. 6 is another schematic diagram of an information block according to an implementation of the present disclosure.

As an example, a starting position of control information of cell #0 configured for the terminal device in the DCI is an S1-th bit, and a starting position of the control information of cell #1 configured for the terminal device in the DCI is an S2-th bit. In the a case shown in FIG. 4, the control information of cell #0 and cell #1 included in the DCI is as shown in FIG. 6. After receiving the DCI, the terminal device reads the control information field of cell #0 according to the DCI and determines the control information of cell #0; read the control information field of cell #1 according to the DCI, and determine that the control information of cell #1 is invalid after finding that all of bits corresponding to the control information field of cell #1 are "1", so the control information of cell #1 is not determined.

(c) Frequency Domain Resource Indication Information

Figure 7:
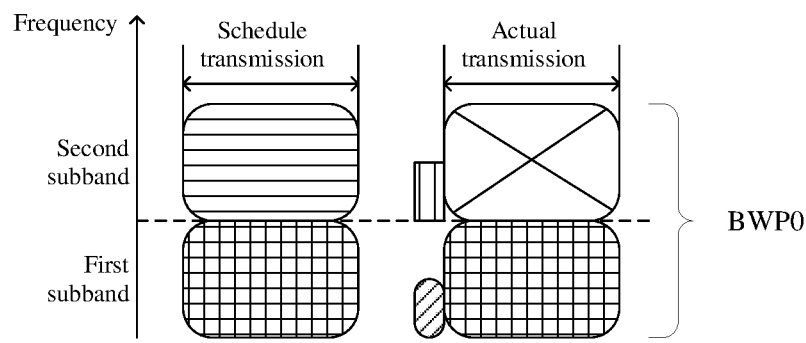
FIG. 7 is a schematic diagram of transmitting a signal on an unlicensed spectrum according to an implementation of the present disclosure.

In an NR-U system on an unlicensed spectrum, when a system carrier bandwidth is greater than 20 MHz for broadband transmission, the terminal device may be configured with multiple BWPs and only one BWP being activated. When the activated BWP includes multiple subbands, the network device may perform channel detection on the subbands in the activated BWP, and transmit a physical downlink shared channel (PDSCH) through a subband with successful channel detection. As shown in FIG. 7, BWP 0 configured for the terminal device by the network device includes a first subband and a second subband, and the network device plans to transmit a PDSCH to the terminal device by scheduling the first subband and the second subband. However, when the network device performs channel detection on the first subband and the second subband, the channel detection of the first subband succeeds and that of the second subband fails, so that the network device transmits the PDSCH to the terminal device through the first subband in BWP 0.

It can be seen that in the above process, a frequency domain bandwidth actually used by the network device for a signal transmission is determined according to a result of channel detection. In order for the terminal device to determine the frequency domain bandwidth actually used by the network device for the signal transmission, the network device may indicate whether at least one subband can be used for a downlink reception in the DCI.

Optionally, in an implementation of the present disclosure, the frequency domain resource indication information may be used for indicating whether at least one subband in the first cell is available, in other words, the frequency domain resource indication information may be used for indicating frequency domain resource usage status in the first cell.

For example, if the first cell includes multiple subbands, a high layer may configure a number of subbands L and/or subband serial numbers included in the first cell. The frequency domain resource indication information may include L bits, the L bits may be used for indicating whether the subband included in the first cell is available or unavailable, and L is a positive integer. Herein bits of subbands correspond to bits of frequency domain resource indication information one to one. For example, the first cell has three subbands, namely subband 1, subband 2 and subband 3, and the frequency domain resource indication information may include three bits "xyz". Bit "x" may indicate whether subband 1 is available, bit "y" may indicate whether subband 2 is available, and bit "z" may indicate whether subband 3 is available.

(d) Second Indication Information

It should be noted that when performing a downlink transmission, the network device prepares in advance, and performs the downlink transmission immediately after LBT is successful. Therefore, the network device cannot prepare the frequency domain resource indication information at a beginning of the downlink transmission. If the DCI is sent at the beginning of the downlink transmission and includes the frequency domain resource indication information, it is further necessary to indicate whether the frequency domain resource indication information in the DCI is valid.

In an implementation of the present disclosure, the first information block may further include second indication information, and the second indication information is used for determining whether the frequency domain resource indication information included in the first information block is valid. It should be understood that in the implementation of the present disclosure, the validity of the frequency domain resource indication information may include, but is not limited to, being used for indicating a frequency domain resource usage status in the first cell, and the invalidity of the frequency domain resource indication information may include, but is not limited to, indicating that the network device is temporarily unable to indicate the frequency domain resource usage status.

As an example, the second indication information may be an independent information field.

illustratively, the second indication information may include 1 bit, bit "1" indicates that the frequency domain resource indication information is a valid value and bit "0" indicates that the frequency domain resource indication information is an invalid value; or, bit "1" indicates that the frequency domain resource indication information is an invalid value and bit "0" indicates that the frequency domain resource indication information is a valid value. At this time, if the first cell includes L subbands, the frequency domain resource indication information may include L+1 bits, that is, L bits in the frequency domain resource indication information indicate whether L subbands of the first cell are available, and the extra 1 bit is used for indicating whether the frequency domain resource indication information is valid.

Further illustratively, the first indication information may include multiple bits. If the multiple bits are the same, it means that the frequency domain resource indication information is valid; if at least two bits of the multiple bits are different, it means that the frequency domain resource indication information is invalid. For example, "000" indicates that the frequency domain resource indication information is valid, and "010" indicates that the frequency domain resource indication information is invalid.

Further illustratively, the first indication information may include multiple bits. If the multiple bits are the same and all are "1", it means that the frequency domain resource indication information is valid, and if the multiple bits are the same and all are "0", it means that the frequency domain resource indication information is invalid.

As another example, the second indication information may be a third information state in the frequency domain resource indication information. Optionally, the third information state indicates that the frequency domain resource indication information is invalid.

For example, the third indication information may be a special information state in the frequency domain resource indication information. If all bits of the frequency domain resource indication information are "1" or "0", it means that the frequency domain resource indication information is invalid, otherwise, the frequency domain resource indication information is used for indicating the frequency domain resource usage status in the first cell.

As another example, the network device may send the frequency domain resource indication information of whether the L subbands are available through at least one of the L subbands. If the third information state indicates that the frequency domain resource indication information indicates that all the L frequency domain subbands are unavailable, in this case, the terminal device may determine that the network device has not prepared the frequency domain resource indication information yet although the network device occupies a channel.

For example, the first cell includes 4 subbands, namely subbands 0-3, which are represented by 4 bits, in which bit "0" means that a subband is unavailable and bit "1" means that a subband is available. If the bits of the second indication information are "1111", it means that all four subbands of the first cell are available, and if the bits of the second indication information are "0011", it means that subband 0 and subband 1 are unavailable, while subband 2 and subband 3 are available. If the bits of the second indication information are "0000" and the network device sends the DCI including the second indication information through at least one of subbands 0 to 3, it means that the network device has not temporarily prepared the frequency domain resource indication information of the first cell.

In a possible implementation, the frequency domain resource indication information field is configurable. For example, if the first cell has only one subband, or the first cell is not allowed to use part of subbands for transmission when the first cell includes multiple subbands, the control information of the first cell may not be configured with frequency domain resource indication information.

(e) SFI Information

In an implementation of the present disclosure, the SFI information may be SFI information in the COT.

In a possible implementation, a time length indicated by the SFI information may be less than or equal to a first COT length, herein the first COT length may be a COT length used by the network device for a transmission or a maximum COT length. The maximum COT length may be MCOT.

Optionally, the time length indicated by the SFI information may be a first COT length, or may be a time length used by the network device for downlink signal transmission.

For example, after successful channel detection, the network device obtains a transmission opportunity of 5 ms, and the network device may share 5 ms with the terminal device, i.e., the network device may use part of 5 ms for a downlink transmission and part of 5 ms for an uplink transmission. For example, the network device uses a first 3 ms of the 5 ms for a downlink transmission and a last 2 ms for an uplink transmission. At this time, the time length indicated by the SFI information may be 3 ms, i.e., the time length used by the network device for the downlink signal transmission. Or, the time length indicated by the SFI information may be 5 ms, i.e., the first COT length.

It should be noted that in the unlicensed spectrum, after obtaining a transmission opportunity of a channel, a time length that the network device may occupy the channel cannot exceed the MCOT. Otherwise, the terminal device may regard the time length indicated by SFI information as a COT resource of the network device, resulting in an unfair channel sharing. Considering that an uplink transmission of the terminal device may occur in or outside the COT of the network device, in other words, the network device may or may not share the COT with the terminal device. Optionally, the time length used by the network device for downlink signal transmission indicated by the SFI information is less than or equal to the first COT length.

Optionally, in an implementation of the present disclosure, the first information block may further include third indication information, and third indication information is used for determining whether the SFI information of the first cell included in the first information block is valid.

Optionally, the third indication information may be an independent information field, or if the information block includes SFI information, the third indication information may be a fourth information state of the SFI information. Optionally, the fourth information state indicates that the SFI information is invalid.

It should be understood that an implementation mode in which the third indication information indicates whether the SFI information of the first cell is valid may refer to the implementation mode in which the second indication information indicates whether the frequency domain resource indication information is valid, which will not be described here for brevity.

(f) COT Length Information and/or End Position Information of a COT

The COT length information may refer to COT length information from a time unit of sending the DCI by the network device. The time unit may be a subframe, a slot, a time domain symbol, or a short transmission timing interval (sTTI). For example, the COT length information may include a number of slots or symbols.

The end position information of the COT may include a position of an ending time unit. For example, the end position information includes a position of an ending slot or symbol.

Or, the COT length information may refer to a number of remaining slots in the COT from a slot when the network device sends the DCI, and the end position information of the COT includes an end position of a symbol on a last slot determined according to the length information.

It should be understood that the communication transmission on an unlicensed spectrum is opportunistic, and a preconfigured slot format combination may not completely match opportunistic transmission requirements. Therefore, the network device may indicate the COT length information and/or the end position information of the COT through the DCI, and the terminal device may determine the end position of the COT according to the information. In this case, if the first information block includes SFI information, a maximum value of the time length indicated by the SFI information may not be limited. At this time, the method 200 may further include: the terminal device determines a slot format of the first cell in the COT according to the COT length information and/or the end position information of the COT, and according to the SFI information.

(g) PRACH Resource Indication Information

A PRACH resource indication information field is configurable. If the first cell is a primary cell (PCell) or a primary secondary cell (PSCell), the network device may dynamically indicate a PRACH resource, that is, the first information block may include PRACH resource indication information of the first cell. If the first cell is not a PCell or a PSCell, the network device may not necessarily dynamically indicate the PRACH resource, that is, the first information block may not necessarily include the PRACH resource indication information of the first cell.

Optionally, in an implementation of the present disclosure, whether the control information of the first cell includes the PRACH resource indication information may be configured by a high layer parameter.

(h) Position Indication Information of an SSB.

SSB may stand for synchronization signal (SS)/PBCH Block, and PBCH denotes a physical broadcast channel.

Optionally, in an implementation of the present disclosure, the position indication information field of the SSB is configurable. Or, whether the control information of the first cell includes the position indication information of the SSB may be configured by a high layer parameter.

Optionally, the position indication information of the SSB may be used for determining the first time frequency resource for transmitting the SSB in the first cell. For example, the position indication information of the SSB may be used for determining which SSB candidate position or SSB candidate positions on the first cell are used for SSB transmission.

Optionally, in an implementation of the present disclosure, the first time frequency resource may be explicitly indicated, for example, the network device may explicitly indicate an SSB candidate position for SSB transmission in the first cell. Or, the first time frequency resource may be implicitly indicated. For example, the network device may indicate information such as a transmission period of discovery reference signal (DRS), a number of SSBs transmitted, and a quasi-co-located (QCL) relationship of SSBs, and the terminal device may determine the SSB candidate position for SSB transmission in the first cell according to the information.

Optionally, the method 200 may further include that the terminal device determines whether to detect PDCCH according to the first time frequency resource.

In a possible implementation, if the terminal device determines that an SSB is sent on the first time frequency resource according to the position indication information of the SSB, and the terminal device determines that the second time frequency resource of a first PDCCH candidate at least partially overlaps with the first time frequency resource, the terminal device may not detect the first PDCCH candidate.

Or, the terminal device may not detect the first PDCCH candidate on the time frequency resource where the second time frequency resource overlaps with the first time frequency resource.

In a possible implementation, if the terminal device determines that an SSB is sent on the first time frequency resource according to the SSB position indication information, and the terminal device determines that the second time frequency resource of the first PDCCH candidate does not overlap with the first time frequency resource, the terminal device may detect the first PDCCH candidate.

In another possible implementation, the terminal device determines that a third time frequency resource of a second PDCCH candidate at least partially overlaps with the first time frequency resource, and if the second PDCCH candidate belongs to the common search space set, the terminal device detects the second PDCCH candidate on the third time frequency resource. And if the second PDCCH candidate does not belong to the common search space set, the terminal device does not detect the second PDCCH candidate.

Or, the terminal device determines that the third time frequency resource of the second PDCCH candidate at least partially overlaps with the first time frequency resource, and the terminal device does not detect the second PDCCH candidate on the time frequency resource where the third time frequency resource and the first time frequency resource overlap.

In another possible implementation, the terminal device determines that a fourth time frequency resource of a third PDCCH candidate at least partially overlaps with the first time frequency resource, and if the third PDCCH candidate is a common PDCCH, the terminal device detects the third PDCCH candidate on the fourth time frequency resource. And if the third PDCCH candidate is a dedicated PDCCH of the terminal device, the terminal device does not detect the third PDCCH candidate on the fourth time frequency resource.

Or, the terminal device determines that the fourth time frequency resource of the third PDCCH candidate at least partially overlaps with the first time frequency resource, and the terminal device does not detect the third PDCCH candidate on the time frequency resource where the fourth time frequency resource and the first time frequency resource overlap.

It should be understood that the name of the PDCCH candidate is not limited in the implementations of the present disclosure, that is, the PDCCH candidate may also be expressed as other names. For example, the PDCCH candidate may also be expressed as a PDCCH to be detected, or a PDCCH candidate to be detected, etc.

It should be also understood that in the implementations of the present disclosure, "first", "second" and "third" etc. are only for distinguishing different objects, which do not construct a limitation on the scope of the implementations of the present disclosure.

The above detection modes can enable the terminal device for determining whether to detect the PDCCH that at least partially overlaps with the time frequency resources of the SSB after determining the time frequency resources for transmitting the SSB, thereby reducing blind detection times of the PDCCH of the terminal device.

In the implementations of the present disclosure, the DCI sent by the network device to the terminal device may include at least one information block, and the first information block in the at least one information block may include the control information of the first cell on the unlicensed spectrum, so that the control information indication in the NR-U system can be dynamically achieved.

Optionally, in an implementation of the present disclosure, the control information in the DCI may take a subband as a unit. For example, for each subband, the network device may configure the terminal device with the following information: a subband identifier, a starting position of the subband in the DCI, and a reference subcarrier interval etc. After receiving the DCI, the terminal device may find the identifier of the subband according to a high layer configuration parameter, determine the starting position of the information block corresponding to the subband in the DCI, find a DCI bit corresponding to the subband and read signal transmission indication information of the subband.

Optionally, the implementations of the present disclosure may also include another method 300 for transmitting control information. The method 300 may be performed by a terminal device and a network device, the terminal device may be, for example, the terminal device 120 shown in FIG. 1, and the network device may be, for example, the network device 110 shown in FIG. 1. As shown in FIG. 3, the method 300 may include at least part of following acts 310 and 320.

In 310, a network device sends DCI sent to a terminal device, wherein the DCI includes at least one information block, an information block 1 of the at least one information block includes control information of a first subband, and the information block 1 may include but is not limited to at least one type of the following information: a first subband identifier, SFI information, frequency domain resource indication information, COT length information, end position information of the COT, PRACH resource indication information, or position indication information of an SSB.

In 320, the terminal device receives the DCI sent by the network device.

The DCI may be carried in a dedicated PDCCH of the terminal device or in a common PDCCH.

Optionally, in an implementation of the present disclosure, the information block 1 may further include indication information 1, the indication information 1 is used for determining whether the control information of the first subband included in the information block 1 is valid, wherein the indication information 1 may be an independent information field.

Optionally, in an implementation of the present disclosure, the information block 1 may include first indicator information, the first indicator information may be used for determining that the control information of the first subband included in the information block 1 is at least partially invalid, herein the first indicator information may be an information state 1 of at least one type of information included in the information block 1, or the first indicator information may be an information state 2 of part or all of bits in the information block.

Optionally, in an implementation of the present disclosure, the information block 1 may further include indication information 2, the indication information 2 is used for determining whether the frequency domain resource indication information included in the information block 2 is valid, herein the indication information 2 may be an independent information field.

Optionally, in an implementation of the present disclosure, the information block 1 may include indication information 2, the indication information 2 may be used for determining the frequency domain resource indication information included in the information block 2 is invalid, herein the indication information 2 may be an information state 3 in the frequency domain resource indication information.

Optionally, in an implementation of the present disclosure, the information block 1 includes SFI information, and a time length indicated by the SFI information may be less than or equal to a second COT length, herein the second COT length may be a COT length used by the network device for a transmission or a maximum COT length.

Optionally, in an implementation of the present disclosure, the time length indicated by the SFI information may be the second COT length, or may be a time length used by the network device for downlink signal transmission.

Optionally, in an implementation of the present disclosure, if the information block 1 includes COT length information and/or end position information of the COT, and includes SFI information, the method 300 may further include: the terminal device determines a slot format of the first subband in the COT according to the COT length information and/or the end position information of the COT, and according to the SFI information.

Optionally, in an implementation of the present disclosure, the information block 1 includes position indication information of an SSB, and the position indication information of the SSB is used for determining a time frequency resource 1 for transmitting the SSB in the first subband.

Optionally, in an implementation of the present disclosure, the method 300 may further include: if the terminal device determines that a time frequency resource 2 of a fourth PDCCH candidate at least partially overlaps with the time frequency resource 1, the terminal device does not detect the fourth PDCCH candidate on the time frequency resource 2; or, if the terminal device determines that the time frequency resource 2 and the time frequency resource 1 do not overlap, the terminal device detects the fourth PDCCH candidate on the time frequency resource 2.

Optionally, in an implementations of the present disclosure, the method 300 may further include: the terminal device determines that a time frequency resource 3 of a fifth PDCCH candidate and the time frequency resource 1 at least partially overlap, herein if the fifth PDCCH candidate belongs to a common search space set, the terminal device may detect the fifth PDCCH candidate on the time frequency resource 3; or, if the fifth PDCCH candidate does not belong to the common search space set, the terminal device may not detect the fifth PDCCH candidate on the time frequency resource 3.

Optionally, in an implementation of the present disclosure, the method 300 may further include: the terminal device determines that a time frequency resource 4 of a sixth PDCCH candidate and the time frequency resource 1 at least partially overlap, herein if the sixth PDCCH candidate is a common PDCCH, the terminal device may detect the sixth PDCCH candidate on the time frequency resource 4; or, if the sixth PDCCH candidate is a dedicated PDCCH of the terminal device, the terminal device may not detect the sixth PDCCH candidate on the time frequency resource 4.

Optionally, in an implementation of the present disclosure, the information included in the information block 1 may be preset; or, the information included in the information block 1 may be determined according to a high layer configuration parameter.

Optionally, in an implementation of the present disclosure, a size of information bits included in the information block 1 may be preset; or, the size of the information bits included in the information block 1 may be configured by a high layer; or, the size of the information bits included in the information block 1 may be determined according to a high layer configuration parameter.

Optionally, in an implementation of the present disclosure, the information block 1 may correspond to a second channel access equipment type, the second channel access equipment type may be LBE or FBE.

Optionally, in an implementation of the present disclosure, a corresponding relationship between the information block 1 and the second channel access equipment type may be determined according to a high layer configuration parameter.

Optionally, in an implementation of the present disclosure, the DCI may only include one information block, which is the information block 1, in other words, the DCI only includes the control information of the first subband.

Optionally, in an implementation of the present disclosure, the DCI may include at least one information block, and each information block in the at least one information block includes control information of a subband. Herein a size of bits included in each of the at least one information block is the same, or the size of bits included in each of the at least one information block is independently determined.

Optionally, in an implementation of the present disclosure, the subband may be a BWP, and the size of the subband may be a size of the BWP.

Optionally, in an implementation of the present disclosure, a subband may be a frequency resource size for performing LBT of a communication device such as network device, for example, the size of the subband may be 20 MHz or an integer multiples of 20 MHz. In some special frequency bands, the size of the subband may be 10 MHz.

Figure 8:
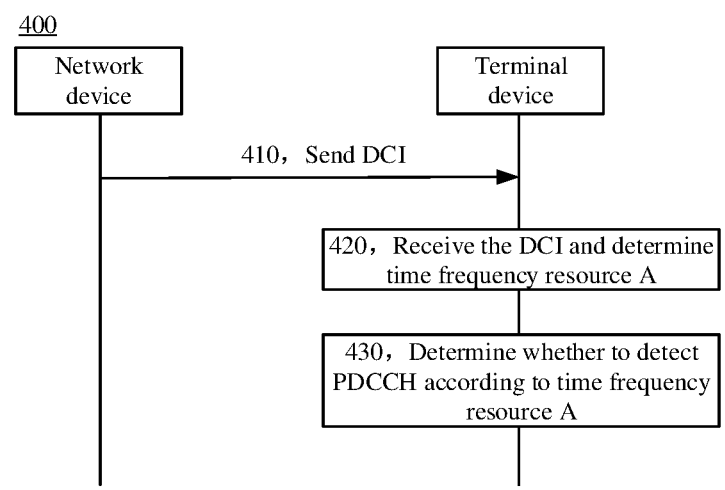
FIG. 8 is a schematic flowchart of a method for detecting PDCCH according to an implementation of the present disclosure.

Optionally, the implementations of the present disclosure further provide a method 400 for detecting PDCCH. FIG. 8 is a schematic flowchart of the method 400 for detecting PDCCH according to an implementation of the present disclosure. As shown in FIG. 8, the method 400 may include at least part of following acts 410 to 430.

It should be understood that an application scenario of the method 400 is not limited in the implementations of the present disclosure. For example, the method 400 may be applied to a scenario of unlicensed spectrum, and may also be applied to a scenario of licensed spectrum.

In 410, a network device sends DCI or a media access control (MAC) control element (CE) information to a terminal device, the DCI or MAC information includes indication information for determining a time frequency resource A for transmitting an SSB in a first cell or a first subband.

In 420, the terminal device receives the DCI or MAC information, and determines the time frequency resource A according to the DCI or MAC information.

In 430, the terminal device determines whether to detect PDCCH according to the time frequency resource A.

The indication information included in the DCI or MAC information is used for determining the time frequency resource A for transmitting the SSB in the first cell or the first subband.

In an implementation, if the terminal device determines that a time frequency resource B of a PDCCH candidate A at least partially overlaps with the time frequency resource A, the terminal device may determine not to detect the PDCCH candidate A. Or, the terminal device may determine not to detect the PDCCH candidate A on the time frequency resource B.

In another implementation, if the terminal device determines that the time frequency resource B of the PDCCH candidate A does not overlap with the time frequency resource A, the terminal device may detect the PDCCH candidate A.

In another implementation, if the terminal device determines that the time frequency resource B of the PDCCH candidate A at least partially overlaps with the time frequency resource A, and the PDCCH candidate A belongs to a common search space set, the terminal device may detect the PDCCH candidate A on the time frequency resource B. If the PDCCH candidate A does not belong to the common search space set, the terminal device may not detect the PDCCH candidate A.

In another implementation, if the terminal device determines that the time frequency resource B of the PDCCH candidate A at least partially overlaps with the time frequency resource A, and the PDCCH candidate A is a common PDCCH, the terminal device may detect the PDCCH candidate A on the time frequency resource B. And if the PDCCH candidate A is a dedicated PDCCH of the terminal device, the terminal device may not detect the PDCCH candidate A.

It should be understood that although methods 200-400 are separately described above, it does not mean that the methods 200-400 are independent. Instead, cross reference may be made between the descriptions of the methods. For example, the related description in method 200 can be applied to method 300 and method 400. For the sake of brevity, the method 300 and method 400 are not described too much in the implementations of the present disclosure.

The preferred implementations of the present disclosure have been described in detail above with reference to the attached drawings, but the present disclosure is not limited to specific details of the above implementations. Within the technical conception of the present disclosure, various simple modifications can be made to the technical solutions of the present disclosure, all of which fall within the protection scope of the present disclosure.

For example, various specific technical features described in the above specific implementations may be combined in any suitable way without conflicts. In order to avoid unnecessary repetition, the present disclosure will not explain any possible combination ways separately.

For another example, different implementations of the present disclosure may be combined arbitrarily as long as they do not go against the conception of the present disclosure, and they should also be regarded as contents disclosed in the present disclosure.

It should be understood that sequence numbers of the foregoing processes do not mean execution sequences in various method implementations of the present disclosure. The execution sequences of the processes should be determined according to functions and internal logic of the processes, and should not be construed as any limitation on the implementation processes of the implementations of the present disclosure.

The methods for transmitting control information according to implementations of the present disclosure have been described in detail above, and communication devices according to implementations of the present disclosure will be described below in combination with FIGS. 9 to 11. Technical features described in the method implementations are applicable to the following device implementations.

Figure 9:
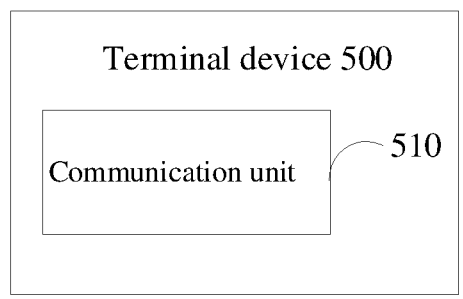
FIG. 9 is a schematic block diagram of a terminal device according to an implementation of the present disclosure.

FIG. 9 shows a schematic block diagram of a terminal device 500 according to an implementation of the present disclosure. As shown in FIG. 9, the terminal device 500 includes a communication unit 510.

Herein, the communication unit 510 is configured to receive DCI sent by a network device, the DCI includes at least one information block, a first information block of the at least one information block includes control information of a first cell, and the first information block includes at least one type of the following information: an identifier of the first cell, SFI information, frequency domain resource indication information, COT length information, end position information of the COT, PRACH resource indication information, or position indication information of an SSB.

Optionally, in an implementation of the present disclosure, the first information block includes first indication information, the first indication information is used for determining whether the control information of the first cell included in the first information block is valid, herein the first indication information is an independent information field.

Optionally, in an implementation of the present disclosure, the first information block may include first indication information, the first indication information is used for determining whether the control information of the first cell included in the first information block is at least partially invalid. The first indication information is a first information state of at least one type of information included in the first information block; or, the first indication information is a second information state of part or all of bits in the first information block.

Optionally, in an implementation of the present disclosure, the first information block includes second indication information, the second indication information is used for determining whether the frequency domain resource indication information included in the first information block is valid, herein the second indication information is an independent information field.

Optionally, in an implementation of the present disclosure, the first information block includes second indication information, the second indication information is used for determining the frequency domain resource indication information included in the first information block is invalid, and the second indication information is a third information state in the frequency domain resource indication information.

Optionally, in an implementation of the present disclosure, the first information block includes the SFI information, and a time length indicated by the SFI information is less than or equal to a first COT length, herein the first COT length is a COT length used by the network device for a transmission or a maximum COT length.

Optionally, in an implementation of the present disclosure, the time length is the first COT length; or, the time length is a time length used by the network device for downlink signal transmission.

Optionally, in an implementation of the present disclosure, the first information block includes the COT length information and/or the end position information of the COT, and includes the SFI information, and the terminal device 500 further includes a processing unit 520.

Herein, the processing unit 520 is configured to determine a slot format of the first cell in the COT according to the COT length information and/or the end position information of the COT, and according to the SFI information.

Optionally, in an implementation of the present disclosure, the first information block includes the position indication information of the SSB, the position indication information of the SSB is used for determining a first time frequency resource for transmitting the SSB in the first cell.

Optionally, in an implementation of the present disclosure, the terminal device 500 further includes a processing unit 520.

Herein, the processing unit 520 is configured to not detect a first PDCCH candidate on a second time frequency resource if determining that the second time frequency resource of the first PDCCH candidate at least partially overlaps with the first time frequency resource.

Or, the processing unit 520 is further configured to detect the first PDCCH candidate on the second time frequency resource if determining that the second time frequency resource does not overlap with the first time frequency resource.

Optionally, in an implementation of the present disclosure, the terminal device 500 further includes a processing unit 520 configured to determine that a third time frequency resource of a second PDCCH candidate at least partially overlaps with the first time frequency resource.

The processing unit 520 is further configured to detect the second PDCCH candidate on the third time frequency resource if the second PDCCH candidate belongs to a common search space set; or, not detect the second PDCCH candidate on the third time frequency resource if the second PDCCH candidate does not belong to the common search space set.

Optionally, in an implementation of the present disclosure, the information included in the first information block is preset; or, the information included in the first information block is determined according to a high layer configuration parameter.

Optionally, in an implementation of the present disclosure, a size of information bits included in the first information block is preset; or, the size of information bits included in the first information block is configured by a high layer; or, the size of information bits included in the first information block is determined according to a high layer configuration parameter.

Optionally, in an implementation of the present disclosure, the first information block corresponds to a first channel access equipment type, and the first channel access equipment type is LBE or FBE.

Optionally, in an implementation of the present disclosure, a corresponding relationship between the first information block and the first channel access equipment type is determined according to a high layer configuration parameter.

Optionally, in an implementation of the present disclosure, the DCI includes an information block, the information block is the first information block, and the DCI includes the control information of the first cell.

Optionally, in an implementation of the present disclosure, the DCI includes at least one information block, and each of the at least one information block includes control information of a cell; herein a size of bits included in each of the at least one information block is the same, or the size of bits included in each of the at least one information block is independently determined.

Optionally, in an implementation of the present disclosure, the DCI is carried in a dedicated PDCCH of the terminal device 500; or, the DCI is carried in a common PDCCH.

It should be understood that the terminal device 500 may correspond to the terminal device in the method 200, and may implement corresponding operations of the terminal device in the method 200, which will not be repeated here for sake of brevity.

It should also be understood that the terminal device 500 may correspond to the terminal device in the method 300 and method 400, which may achieve corresponding operations of the terminal device in the method 300 and method 400, which will not be repeated here for sake of conciseness.

Figure 10:
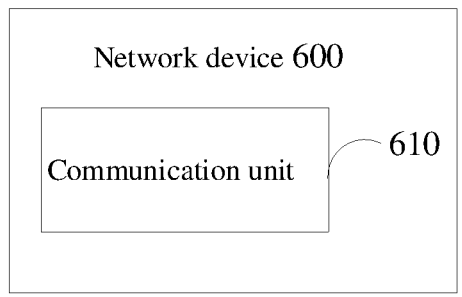
FIG. 10 is a schematic block diagram of a network device according to an implementation of the present disclosure.

FIG. 10 is a schematic block diagram of a network device 600 according to an implementation of the present disclosure. As shown in FIG. 10, the network device 600 includes a communication unit 610.

Herein, the communication unit 610 is configured to send DCI to a terminal device, the DCI includes at least one information block, a first information block of the at least one information block includes control information of a first cell, and the first information block includes at least one type of the following information: an identifier of the first cell, SFI information, frequency domain resource indication information, COT length information, end position information of the COT, PRACH resource indication information, or position indication information of an SSB.

Optionally, in an implementation of the present disclosure, the first information block includes first indication information, the first indication information is used for determining whether the control information of the first cell included in the first information block is valid, herein the first indication information is an independent information field.

Optionally, in an implementation of the present disclosure, the first information block includes first indication information, the first indication information is used for determining that the control information of the first cell included in the first information block is at least partially invalid, and the first indication information is a first information state of at least one type of information included in the first information block; or, the first indication information is a second information state of part or all of bits in the first information block.

Optionally, in an implementation of the present disclosure, the first information block includes second indication information, the second indication information is used for determining whether the frequency domain resource indication information included in the first information block is valid, herein the second indication information is an independent information field.

Optionally, in an implementation of the present disclosure, the first information block includes second indication information, the second indication information is used for determining the frequency domain resource indication information included in the first information block is invalid, and the second indication information is a third information state in the frequency domain resource indication information.

Optionally, in an implementation of the present disclosure, the first information block includes the SFI information, and a time length indicated by the SFI information is less than or equal to a first COT length, herein the first COT length is a COT length used by the network device for a transmission or a maximum COT length.

Optionally, in an implementation of the present disclosure, the time length is the first COT length; or, the time length is a time length used by the network device for downlink signal transmission.

Optionally, in an implementation of the present disclosure, the first information block includes the position indication information of the SSB, the position indication information of the SSB is used for determining the first time frequency resource for transmitting the SSB in the first cell.

Optionally, in an implementation of the present disclosure, the information included in the first information block is preset; or, the information included in the first information block is determined according to a high layer configuration parameter.

Optionally, in an implementation of the present disclosure, a size of information bits included in the first information block is preset; or, the size of information bits included in the first information block is configured by a high layer; or, the size of information bits included in the first information block is determined according to a high layer configuration parameter.

Optionally, in an implementation of the present disclosure, the first information block corresponds to a first channel access equipment type, and the first channel access equipment type is LBE or FBE.

Optionally, in an implementation of the present disclosure, a corresponding relationship between the first information block and the first channel access equipment type is determined according to a high layer configuration parameter.

Optionally, in an implementation of the present disclosure, the DCI includes an information block, the information block is the first information block, and the DCI includes the control information of the first cell.

Optionally, in an implementation of the present disclosure, the DCI includes at least one information block, and each of the at least one information block includes control information of a cell; herein a size of bits included in each of the at least one information block is the same, or the size of bits included in each of the at least one information block is independently determined.

Optionally, in an implementation of the present disclosure, the DCI is carried in a dedicated PDCCH of the terminal device, or the DCI is carried in a common PDCCH.

It should be understood that the network device 600 may correspond to the network device in the method 200, and may implement corresponding operations implemented by the network device in the method 200, which will not be described in detail herein for the sake of brevity.

It should be also understood that the network device 600 may correspond to the network device in the method 300 and method 400, and corresponding operations of the network device in the method 300 and method 400 may be implemented, which will not be repeated herein for brevity.

Figure 11:
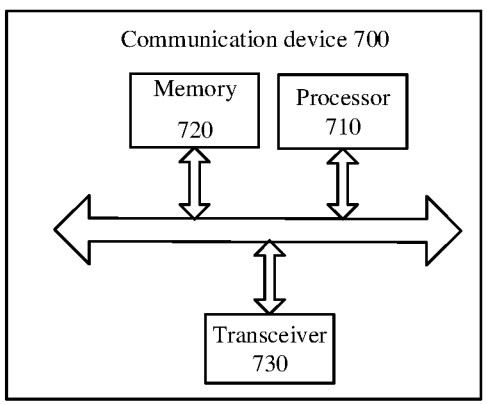
FIG. 11 is a schematic block diagram of a communication device according to an implementation of the present disclosure.

FIG. 11 is a schematic diagram of a structure of a communication device 700 according to an implementation of the present disclosure. The communication device 700 shown in FIG. 11 includes a processor 710, which may call and run a computer program from a memory to implement the methods according to the implementations of the present disclosure.

Optionally, as shown in FIG. 11, the communication device 700 may further include the memory 720. The processor 710 may call and run the computer program from the memory 720 to implement the methods according to the implementations of the present disclosure.

The memory 720 may be a separate device independent of the processor 710 or may be integrated in the processor 710.

Optionally, as shown in FIG. 11, the communication device 700 may further include a transceiver 730, and the processor 710 may control the transceiver 730 to communicate with other devices. Specifically, the transceiver 730 may send information or data to other devices or receive information or data sent by other devices.

The transceiver 730 may include a transmitter and a receiver. The transceiver 730 may further include an antenna, and a quantity of antennas may be one or more.

Optionally, the communication device 700 may be specifically a network device of an implementation of the present disclosure, and the communication device 700 may implement the corresponding processes implemented by the network device in various methods of the implementations of the present disclosure, which will not be repeated here for brevity.

Optionally, the communication device 700 may be specifically a terminal device of the implementation of the present disclosure, and the communication device 700 may implement the corresponding processes implemented by the terminal device in the various methods of the implementations of the present disclosure, which will not be repeated here for brevity.

Figure 12:
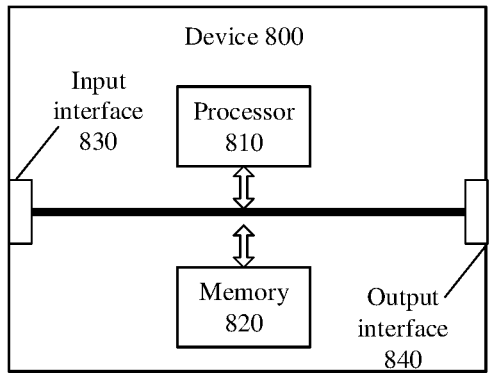
FIG. 12 is a schematic block diagram of a chip according to an implementation of the present disclosure.

FIG. 12 is a schematic diagram of a structure of an apparatus according to an implementation of the present disclosure. An apparatus 800 shown in FIG. 12 includes a processor 810. The processor 810 may call and run a computer program from a memory to implement the method in the implementation of the present disclosure.

Optionally, as shown in FIG. 12, the apparatus 800 may further include a memory 820. The processor 810 may call and run a computer program from the memory 820 to implement the methods in the implementations of the present disclosure.

The memory 820 may be a separate device independent of the processor 810 or may be integrated in the processor 810.

Optionally, the apparatus 800 may further include an input interface 830. The processor 810 may control the input interface 830 to communicate with other devices or chips, and specifically, may acquire information or data sent by other devices or chips.

Optionally, the apparatus 800 may further include an output interface 840. The processor 810 may control the output interface 840 to communicate with other devices or chips, and specifically, may output information or data to other devices or chips.

Optionally, the apparatus may be applied in a terminal device of an implementation of the present disclosure, and the apparatus may implement the corresponding processes implemented by the terminal device in the various methods of implementations of the present disclosure, which will not be repeated here for brevity.

Optionally, the apparatus may be applied in a network device of the implementation of the present disclosure, and the apparatus may implement corresponding processes implemented by the network device in various methods of the implementations of the present disclosure, which will not be repeated here for brevity.

Optionally, the apparatus 800 may be a chip. It should be understood that the chip mentioned in the implementations of the present disclosure may be referred to as a system-level chip, a system chip, a chip system or a system-on-chip, etc.

It should be understood that the processor in the implementations of the present disclosure may be an integrated circuit chip having a signal processing capability. In an implementation process, the steps of the foregoing method implementations may be implemented by an integrated logic circuit of hardware in the processor or instructions in a form of software. The processor may be a general purpose processor, a Digital Signal Processor (DSP), an Application Specific Integrated Circuit (ASIC), a Field Programmable Gate Array (FPGA) or other programmable logic devices, a discrete gate or a transistor logic device, or a discrete hardware component. The processor may implement or perform various methods, steps and logical block diagrams disclosed in the implementations of the present disclosure. The general purpose processor may be a microprocessor, or the processor may be any conventional processor or the like. The steps of the methods disclosed in combination with the implementations of the present disclosure may be directly embodied to be implemented by a hardware decoding processor, or may be implemented by a combination of hardware and software modules in the decoding processor. The software modules may be located in a storage medium commonly used in the art, such as a random access memory, a flash memory, a read-only memory, a programmable read-only memory or an electrically erasable programmable memory, or a register. The storage medium is located in a memory, and the processor reads the information in the memory and completes the acts of the above methods in combination with its hardware.

It may be understood that the memory in the implementations of the present disclosure may be a volatile memory or a non-volatile memory, or may include both a volatile memory and a non-volatile memory. The non-transitory memory may be a Read-Only Memory (ROM), a Programmable ROM (PROM), an Erasable PROM (EPROM), an Electrically EPROM (EEPROM), or a flash memory. The volatile memory may be a Random Access Memory (RAM) which serves as an external cache. By way of exemplary but not restrictive illustrations, many forms of RAMs are available, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), and a Direct Rambus RAM (DR RAM). It should be noted that the memory in the systems and methods described here is intended to include, without being limited to, these and any other suitable types of memory.

It should be understood that the foregoing memory is an example for illustration, but not for limiting. For example, the memory in the implementations of the present disclosure may also be a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM), a Direct Rambus RAM (DR RAM), or the like. That is, memories in the implementations of the present disclosure are intended to include, without being limited to, these and any other suitable types of memories.

Figure 13:
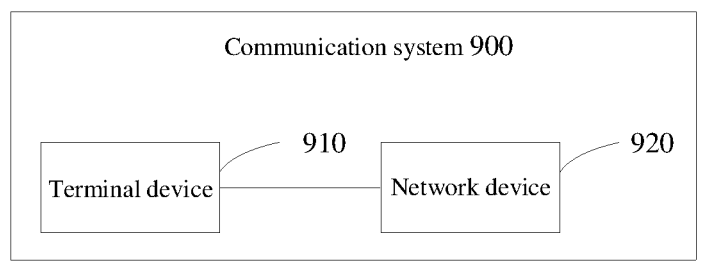
FIG. 13 is a schematic block diagram of a communication system according to an implementation of the present disclosure.

FIG. 13 is a schematic block diagram of a communication system 900 according to an implementation of the present disclosure. As shown in FIG. 13, the communication system 900 may include a terminal device 910 and a network device 920.

Herein, the terminal device 910 may be configured to implement corresponding functions implemented by the terminal device in the above-mentioned methods, and the network device 920 may be configured to implement corresponding functions implemented by the network device in the above-mentioned methods, which will not be repeated here for brevity.

An implementation of the present disclosure further provides a computer readable storage medium configured to store a computer program.

Optionally, the computer-readable storage medium may be applied in the terminal device of the implementations of the present disclosure, and when the computer program is run on a computer, the computer is enabled to perform the corresponding processes implemented by the terminal device in various methods of the implementations of the present disclosure, which will not be repeated here for brevity.

Optionally, the computer readable storage medium may be applied in the network device of the implementations of the present disclosure, and when the computer program is run on a computer, the computer is enabled to perform the corresponding processes implemented by the network device in various methods of the implementations of the present disclosure, which will not be repeated here for brevity.

An implementation of the present disclosure also provides a computer program product including computer program instructions.

Optionally, the computer program product may be applied in the terminal device of the implementations of the present disclosure, and when the computer program instructions are executed by a computer, the computer is enabled to perform the corresponding processes implemented by the terminal device in various methods according to the implementations of the present disclosure, which is not described here for brevity.

Optionally, the computer program product may be applied in the network device of the implementations of the present disclosure, and when the computer program instructions are executed by a computer, the computer is enabled to perform the corresponding processes implemented by the network device in various methods of the implementations of the present disclosure, which will not be repeated here for brevity.

An implementation of the present disclosure also provides a computer program.

Optionally, the computer program may be applied in the terminal device of the implementations of the present disclosure. When the computer program is run on the computer, the computer is enabled to perform the corresponding processes implemented by the terminal device in various methods of the implementations of the present disclosure, which is not described here for brevity.

Optionally, the computer program may be applied to the network device of the implementations of the present disclosure. When the computer program is run on a computer, the computer is enabled to perform corresponding processes implemented by the network device in various methods of the implementations of the present disclosure, which will not be repeated here for brevity.

Those of ordinary skills in the art may recognize that the example units and algorithm steps described in combination with the implementations disclosed herein may be implemented in electronic hardware, or a combination of computer software and electronic hardware. Whether these functions are implemented in hardware or software depends on a specific application and design constraints of the technical solutions. Professional technicians may use different methods to implement the described functions in respect to each particular application, but such implementation should not be considered to be beyond the scope of the present disclosure.

Those skilled in the art may clearly understand that for convenience and conciseness of description, as to the specific working processes of the systems, apparatuses and units described above, reference may be made to the corresponding processes in the method implementations, which will not be repeated here.

In several implementations provided by the present disclosure, it should be understood that the disclosed systems, apparatuses and methods may be implemented in other ways. For example, the apparatus implementations described above are only illustrative, for example, the division of the units is only a logical function division, and there may be other division modes in an actual implementation, for example, a plurality of units or components may be combined or integrated into another system, or some features may be ignored or not executed. On the other hand, the discussed or displayed mutual coupling or direct coupling or communication connection may be indirect coupling or communication connection through some interfaces, apparatuses or units, which may be in electrical, mechanical or other forms.

The unit described as a separate component may or may not be physically separated, and the component shown as a unit may or may not be a physical unit, i.e., it may be located in one place or may be distributed over multiple network units. Some or all of the units may be selected according to actual needs to achieve the objects of the solutions of the implementations.

In addition, various functional units in various implementations of the present disclosure may be integrated in one processing unit, or the various units may be physically present separately, or two or more units may be integrated in one unit.

When the functions are implemented in the form of software functional units and sold or used as an independent product, the software functional units may be stored in a computer readable storage medium. Based on such understanding, the technical solution of the present disclosure, in essence, or the part contributing to the prior art, or the part of the technical solution, may be embodied in the form of a software product stored in a storage medium. The computer software product is stored in a storage medium and includes several instructions for instructing a computer device (which may be a personal computer, a server, or a network device and the like) to perform all or part of the acts of the methods described in various implementations of the present disclosure. The storage medium includes any medium that can store program codes, such as a USB flash disk, a removable hard disk, a Read-Only Memory (ROM), a Random Access Memory (RAM), a magnetic disk, or an optical disk.

The foregoing descriptions are merely specific implementations of the present disclosure, but the protection scope of the present disclosure is not limited thereto. Any variation or substitution that may be readily conceived by a person skilled in the art within the technical scope disclosed by the present disclosure shall fall within the protection scope of the present disclosure. Therefore, the protection scope of the present disclosure shall be subjected to the protection scope of the claims.

What I claim is:

1. A method for transmitting control information, comprising:
    receiving, by a terminal device, downlink control information (DCI) sent by a network device, wherein the DCI comprises an information block, the information block comprises control information of a first cell, and the control information of the first cell comprises:
        frequency domain resource indication information, wherein a starting position of the frequency domain resource indication information in the DCI is configured by a high layer configuration parameter; and
        channel occupation time (COT) length information, wherein a starting position of the COT length information in the DCI is configured by a high layer configuration parameter;
        wherein the COT length information comprised in the control information of the first cell is determined according to a high layer configuration parameter.

2. The method of claim 1, wherein the COT length information indicates a COT length starting from a slot of receiving the DCI by the terminal device.

3. The method of claim 1, wherein the COT length information indicates a number of symbols included in a COT.

4. The method of claim 1, wherein the control information of the first cell further comprises slot format indication (SFI) information, and a time length indicated by the SFI information is less than or equal to a first COT length, wherein the first COT length is a COT length used by the network device for transmission or a maximum COT length.

5. The method of claim 4, wherein the method further comprises:
    determining, by the terminal device, a slot format of the first cell in the first COT according to the SFI information.

6. The method of claim 4, wherein the SFI information comprised in the control information of the first cell is determined according to a high layer configuration parameter.

7. The method of claim 1, wherein the frequency domain resource indication information comprised in the control information of the first cell is determined according to a high layer configuration parameter.

8. The method of claim 1, wherein the frequency domain resource indication information is used for indicating whether at least one subband in the first cell is available.

9. A method for transmitting control information, comprising:
    sending, by a network device, downlink control information (DCI) to a terminal device, wherein the DCI comprises an information block, the information block comprises control information of a first cell, and the control information of the first cell comprises:
        frequency domain resource indication information, wherein a starting position of the frequency domain resource indication information in the DCI is configured by a high layer configuration parameter; and
        channel occupation time (COT) length information, wherein a starting position of the COT length information in the DCI is configured by a high layer configuration, parameter;
        wherein the COT length information comprised in the control information of the first cell is determined according to a high layer configuration parameter.

10. The method of claim 9, wherein the COT length information indicates a COT length starting from a slot of sending the DCI by the network device.

11. The method of claim 9, wherein the COT length information indicates a number of symbols included in a COT.

12. The method of claim 9, wherein the control information of the first cell further comprises slot format indication (SFI) information, and a time length indicated by the SFI information is less than or equal to a first COT length, wherein the first COT length is a COT length used by the network device for transmission or a maximum COT length.

13. The method of claim 12, wherein the SFI information comprised in the control information of the first cell is determined according to a high layer configuration parameter.

14. The method of claim 9, wherein the frequency domain resource indication information comprised in the control information of the first cell is determined according to a high layer configuration parameter.

15. The method of claim 9, wherein the frequency domain resource indication information is used for indicating whether at least one subband in the first cell is available.

16. A terminal device, comprising a transceiver, a processor and a memory, wherein the memory is configured to store a computer program, and the processor is configured to call and run the computer program stored in the memory to control the terminal device to:
    receive downlink control information (DCI) sent by a network device, wherein the DCI comprises an information block, the information block comprises control information of a first cell, and the control information of the first cell comprises:
        frequency domain resource indication information, wherein a starting position of the frequency domain resource indication information in the DCI is configured by a high layer configuration parameter; and
        channel occupation time (COT) length information, wherein a starting position of the COT length information in the DCI is configured by a high layer configuration parameter;

wherein the COT length information comprised in the control information of the first cell is determined according to a high layer configuration parameter.

* * * * *